March 31, 1942.  E. K. CLARK  2,277,845
FLEXIBLE THERMOSTAT CONTROL
Filed Nov. 4, 1939
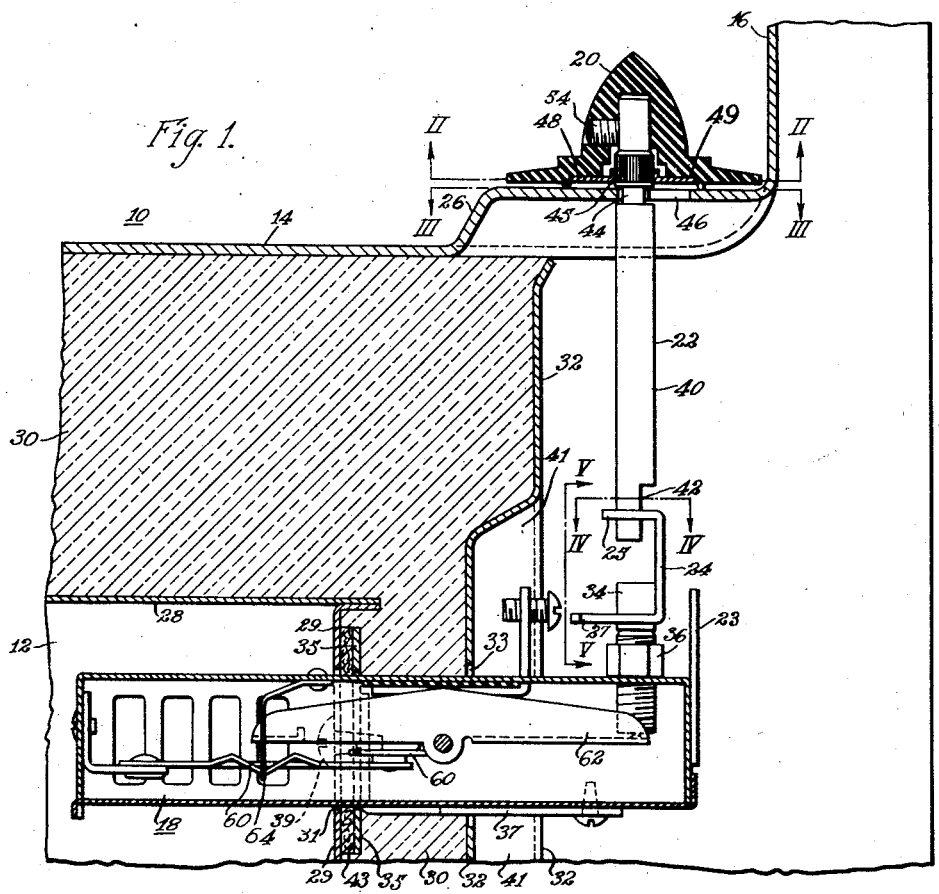
INVENTOR
Earl K. Clark.
BY
W. R. Coley.
ATTORNEY Patented Mar. 31, 1942

2,277,845

UNITED STATES PATENT OFFICE 2,277,845

FLEXIBLE THERMOSTAT CONTROL

Earl K. Clark, Mansfield, Ohio, assignor to Westinghouse Electric & Manufacturing Company, East Pittsburgh, Pa., a corporation of Pennsylvania Application November 4, 1939, Serial No. 302,885

2 Claims. (Cl. 219—35)

My invention relates to thermostats, and more particularly to a flexible remote control for a range-oven thermostat.

An object of my invention is to provide a flexible control including a control knob for a thermostat which permits such thermostat to be rigidly attached to a structure, such as a range, or the like, and permits such thermostat to move with respect to a control knob without any binding action therebetween.

A further object of my invention is to provide a flexible control for a range oven thermostat, or the like, which permits the thermostat to be easily and readily controlled or adjusted from the range platform and, in addition, enables such thermostat to be readily calibrated from the platform.

Another object of my invention is to provide an inexpensive, rugged, flexible, slidable control for a thermostat which permits free relative movement between the control structure and thermostat while permitting a remotely located control knob to readily adjust such thermostat.

Other objects of my invention will either be pointed out specifically in the course of the following description of a device embodying my invention, or will be apparent from such description.

In the accompanying drawing:

Figure 1 is a fragmentary sectional view illustrating a control system embodying my invention associated with a range and range oven thermostat, and Figs. 2, 3, 4 and 5 are sectional views taken along the lines II—II, III—III, IV—IV and V—V, respectively, of Fig. 1.

Referring to the accompanying drawing, in which like characters indicate like parts in the several figures, I illustrate a range 10 having an oven 12, platform 14, back-splasher 16, a thermostat 18, and a control knob 20 mounted upon the platform and adapted to control the thermostat 18 through an operatively associated shaft 22 and U-shaped bracket 24.

The range 10 merely a portion of which is shown in this instance, may be of any construction or shape desired, and includes the oven 12 with the platform 14 located thereabove. The back-splasher 16 is, in this instance, integral with the platform 14 and extends substantially normal thereto along the rear edge thereof. The platform 14 and back-splasher extend back of the oven 12 to permit the thermostat 18 and the necessary controls therefor to be located in back of the oven, in a well known manner. A raised portion 26 is located within and near the rear end of the platform 14 adjacent the back-splasher 16 for supporting the control knob 20 as hereinafter described. It is to be understood that the thermostat 18 and control structure therefor need not be associated with a range, as hereinafter described, but may be operatively associated with any other desired structure.

The oven 12 comprises, in this instance, suitable oven walls, such as an upper wall 28 and a rear wall 29. The upper oven wall 28 is located somewhat below the platform 14 to permit suitable insulating material 30 to be located therebetween, in a well known manner. In addition, a back cover wall 32 is located somewhat in back of the oven rear wall 29 to permit the insulating material 30 to be likewise located therebetween. In this way the oven 12 is adequately insulated in a well known manner. The back cover wall 32 extends upwardly to the lower surface of the platform 14 and is rigidly attached thereto. An aperture 33 is formed within the cover wall 32 of such size to permit the thermostat 18 to pass therethrough and to permit relative movement between the wall 32 and thermostat 18. A pocket 41 is pressed inwardly within the back cover wall 32 about the aperture 33 to permit the terminals of the thermostat 18 to be readily accessible.

The thermostat 18, illustrated herewith, is more fully described and claimed in my copending application, Serial No. 236,226, filed October 21, 1938, and assigned to the assignee of this application. The thermostat 18 has an upwardly extending rotatable adjusting shaft or means 34 located at the rear end thereof threadedly mounted within a suitable bushing 36. The adjusting means 34 is, in this instance, adapted to rotate about its longitudinal axis and thus move in a vertical or longitudinal manner so as to adjust the operation of the thermostat 18 to any desired value.

The adjusting movements of the adjusting means 34 are conveyed to suitable cooperating contacts 60, which are only partially shown, to adjust the operations thereof, and to regulate the temperature of the oven 12, in a well known manner. Such movements of the adjusting means are conveyed to the contacts 60 through the cooperation of a counter-clockwise biased arm 62, a resilient intermediate member 64 and the snap-acting bimetal member 66, as is more fully described in the above-identified copending application.

The thermostat 18 extends into the oven 12 through an aperture 31 in the rear wall 29 thereof, and extends outwardly into the pocket 41 through aperture 33 in the back cover wall 32. A suitable heat insulating gasket 43 is adapted to fit about the aperture 31 tightly against the rear wall of the oven 10 and the thermostat to prevent any heat from passing out of the oven and around the thermostat 18. The gasket 43 is retained against the rear wall 30 by means of a retaining plate 35. Plate 35 and gasket 43 are rigidly attached to the rear wall 30 of oven 12 by means of a thermostat supporting bracket 37 which, in turn, is rigidly attached to the rear wall 29 by means of a suitable bolt 39 in a well known manner. The thermostat 18, while passing through the aperture 31 and gasket 43 rests upon or is supported by the supporting bracket 37 and is rigidly attached thereto in any desired manner.

A suitable U-shaped bracket 24 is, in this instance, rigidly attached to the adjusting shaft 34 of thermostat 18 to afford means for connecting such thermostat to the control knob 20. The U-shaped bracket 24 has a substantially horizontal shorter portion or arm 25 positioned at the top thereof and an irregularly shaped longer portion or arm 27 positioned at the bottom thereof. A substantially D-shaped aperture 38 is located within the upper portion 25 to receive the shaft 22 as hereinafter described. The lower or irregularly-shaped portion 27 of U-shaped member 24 extends out beyond the upper portion 25 and is adapted to engage a stop member 23, attached to thermostat 18 to function as a stop for limiting the rotation of the adjusting means 34 (see Figs. 1, 4 and 5). It, therefore, follows that by rotating the bracket 24, the thermostat 18 will be operatively adjusted through the cooperating adjusting means 34.

The shaft 22 is, in this instance, a vertically mounted elongated member having a central portion 40, an undercut or notched portion 42 at the lower end thereof, an annularly undercut or notched portion 44 at the upper end thereof and a knurled portion 45 located above the notched portion 44. The undercut portion 42 has substantially a D-shaped cross-section and is adapted to loosely fit within the D-shaped aperture 38 of bracket 24 as hereinafter described. The annularly notched portion 44 is at the same time adapted to cooperate with a key-hole shaped aperture 46 (see Fig. 3) within the platform 14 as hereinafter described.

The D-shaped undercut portion 42 of shaft 22 permits the shaft 22 to cooperate with the bracket 24 and to move longitudinally within such bracket while preventing any relative angular movement therebetween. It, therefore, follows that the thermostat 18 may be satisfactorily adjusted by rotating shaft 22 through the cooperation of bracket 24 and adjusting means 34.

The substantially key-hole shaped aperture 46 is, in this instance, located within a small raised portion or boss 26 of platform 14 located substantially above the adjusting means 34 of thermostat 18. The larger portion of the aperture 46 is of sufficient size to permit shaft 22 to pass therethrough. The small or slotted portion of aperture 46 is not large enough to permit the passage of shaft 22 therethrough, but is large enough to permit the notched portion 44 of shaft 22 to fit therein. The larger portion of the key-hole aperture 46 thus permits the shaft 22 to be dropped down through the platform 14 while the smaller portion prevents the passage of shaft 22 therethrough in a manner hereinafter described.

A suitable substantially rectangularly shaped washer 48 may be rigidly attached to the upper or knurled portion 45 of shaft 22 to cooperate with knob 20 to prevent any relative movement therebetween. The washer 48 has outwardly extending tips 59 located at either end thereof to cooperate with correspondingly notched portions 50 of knob 20 (see Fig. 2). The cooperation of tips 59 within notched portions 50 permits the knob 20 to be rigidly attached to the shaft 22 through the washer 48 in a large number of positions and permits the thermostat to be easily calibrated, as hereinafter described.

The knob 20 has an enlarged circular undercut portion 49 within the lower surface thereof (see Figs. 1 and 2) for receiving the washer 48. The notched portions 50 are located about the periphery of such portion 49 and are adapted to cooperate with tips 59 of washer 48 as such washer is fitted within the undercut portion 49.

It will be understood that the flaring or skirt portion of knob 20 may bear the customary temperature index markings, for the convenience of the user. The knob 20 fits over the upper end of shaft 22 and about the washer 48 and is rigidly attached to the shaft 22 by means of a suitable set screw 54. The knob rests upon or is slightly above the raised portion of platform 14 and, having its edge close to the back-splasher 16, prevents the shaft 22 from sliding back within the key-hole slot 46.

When assembling the control structure embodying my invention, the thermostat 18 is inserted through and mounted upon the rear oven wall 29 by means of bracket 37 and screw 39, with the adjusting means 34 located upon the upper surface thereof. The U-shaped bracket 24 is then rigidly attached to the adjusting means 34, if not previously so attached, with the D-shaped aperture 38 thereof being located within the upper portion 25. The shaft 22, with the washer 48 pressed down upon the knurled portion 45 thereof, is then passed down through the enlarged portion of key-hole aperture 46 and the D-shaped portion 42 of shaft 22 is passed through the aperture 38 of bracket 24. The shaft 22 is then straightened up so that the undercut or notched portion 44 thereof fits within the narrow portion of key-hole shaped aperture 46. As such narrow portion has a larger diameter than notched portion 44, this construction prevents the shaft 22 from being moved in a vertical manner.

The knob 20 is then positioned over and upon the shaft 22 so as to cooperate with the washer 48, it being understood that the shaft 22 is first rotated to a predetermined position so as to calibrate the thermostat and its marked skirt portion of knob 20 before the washer 48 and knob 20 are finally fitted together. The knob 20 is thus rigidly attached to the shaft 22 in the predetermined selected position by set screw 54. The knob 20 is located slightly in front of the back-splasher 14 and thus prevents the shaft 22 from being tilted or moved backward within the key-hole shaped aperture 46 to such an extent that it may be removed from the bracket 24 or aperture 46.

It is, therefore, obvious that I have provided a flexible thermostat-adjusting means which has a slidable engagement with the thermostat for permitting free vertical movement relative to the range platform and back-splasher and also relative to the thermostat while substantially preventing any relative angular movements between the thermostat adjusting means and control knob, so as to adjust the thermostat with a minimum of lost motion.

Various modifications may be made in the device embodying my invention without departing from the spirit and scope thereof, and I desire, therefore, that only such limitations shall be placed thereon as are imposed by the prior art and the appended claims.

I claim as my invention:

1. In a range, the combination of a platform having an aperture therein, a backsplasher extending substantially vertical to and along the rear portion of said platform, said aperture having a constricted shaft-retaining end away from the backsplasher and an expanded end toward the backsplasher, an oven thermostat, a control shaft which passes through the expanded end of said aperture in said platform and which disengageably cooperates with said thermostat at its lower end, said shaft having an undercut portion near its upper end to normally receive the platform adjacent the shaft retaining end of said aperture to prevent removal of said shaft therefrom when said shaft is in its operative position, and an operating knob removably attached to the shaft above the platform for manually rotating the shaft to selectively adjust the thermostat, said knob being disposed adjacent to the backsplasher to prevent horizontal movement of the upper end of the shaft whereby the knob and backsplasher maintains the shaft in the shaft-retaining end of the aperture to prevent removal of the shaft therefrom when said knob is attached to the shaft and whereby, when the knob has been removed from the shaft, said shaft may be removed through the expanded end of said aperture after a horizontal movement of said shaft through said aperture toward the backsplasher.

2. In a range, the combination of a platform having a keyhole-shaped aperture therein, a backsplasher extending substantially vertical to and along the rear portion of said platform, an oven thermostat, an intermediate member attached to said thermostat and having at least one portion thereof substantially parallel to the range platform and having an aperture therein, a control shaft which passes through the aperture in said platform, said shaft having an undercut portion near its upper end to normally receive the platform at the smaller end of said keyhole-shaped aperture to prevent removal of said shaft therefrom when said shaft is in its operative position and having a flat side at its lower end to cooperate with the aperture in said intermediate member, said aperture and flattened end of the shaft having complementary configurations so as to prevent any relative rotative movement therebetween while permitting longitudinal movement of the shaft with respect to the intermediate member, and an operating knob attached to the shaft above the platform for manually rotating the shaft and intermediate member to selectively adjust the thermostat, said knob being disposed adjacent to the backsplasher to prevent horizontal movement of the upper end of the shaft whereby the knob and backsplasher prevent removal of the shaft when said knob is attached to the shaft and whereby said shaft may be removed by horizontal movement thereof toward the backsplasher and into the larger end of said keyhole-shaped aperture when the knob has been removed from the shaft.

EARL K. CLARK.